United States Patent Office 3,321,542
Patented May 23, 1967

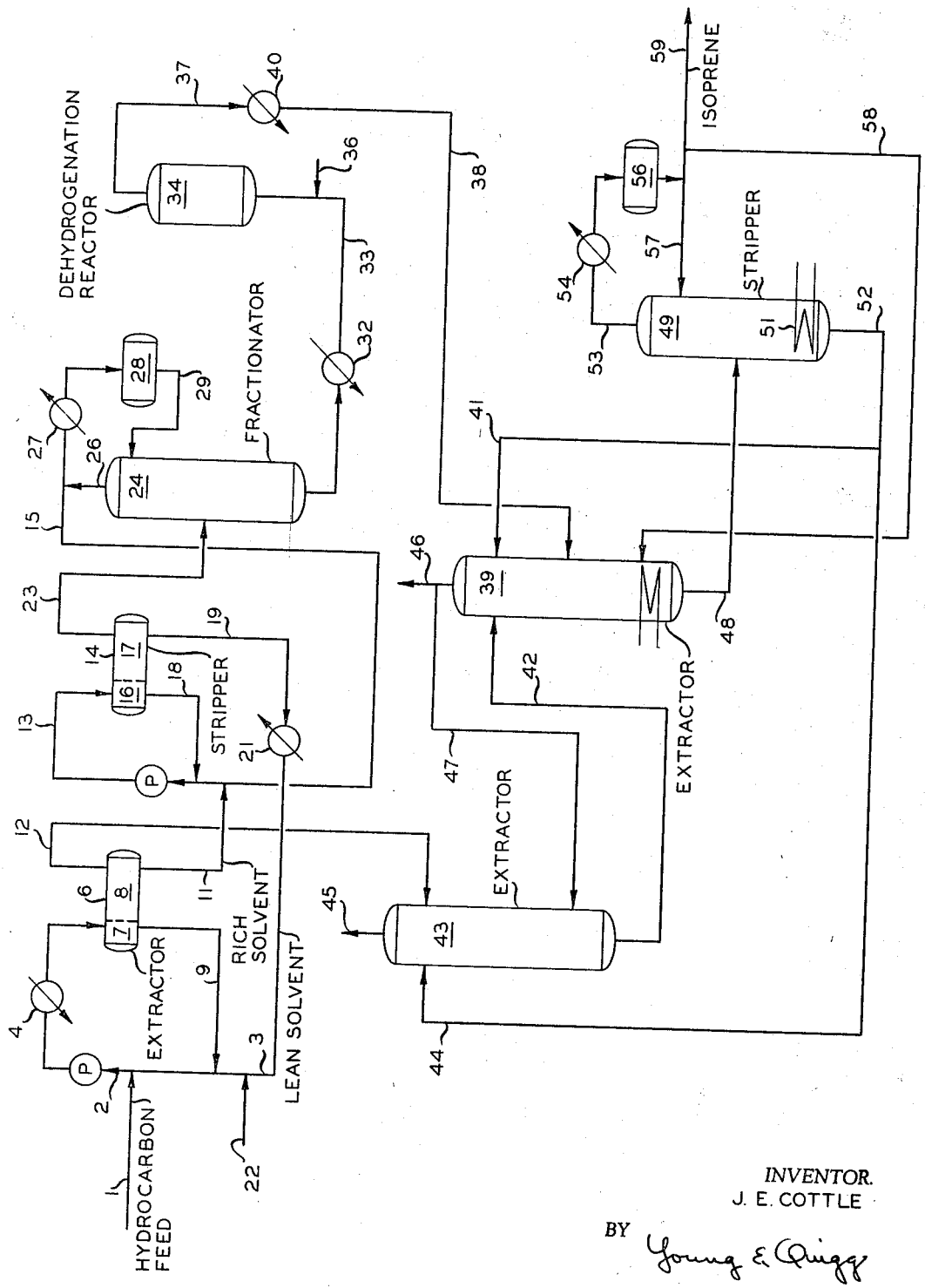

---

3,321,542
PRODUCTION, SEPARATION, AND RECOVERY OF ISOPRENE
John E. Cottle, Bartlesville, Okla., assignor to Phillips Petroleum Company, a corporation of Delaware
Filed May 7, 1963, Ser. No. 278,704
4 Claims. (Cl. 260—680)

This invention relates to a process and apparatus for the production, separation, and recovery of isoprene.

The production of isoprene from a hydrocarbon feed comprising isopentane by dehydrogenation is well known in the prior art. Successful commercial operation of such a process is dependent upon the composition of the hydrocarbon feed used and the separation and recovery steps employed.

Accordingly, I have discovered a simplified process and apparatus for the production, separation, and recovery of isoprene. In this invention, tertiary amylenes (to be understood herein as 2-methylbutene-1 and 2-methylbutene-2) are separated from saturated $C_5$ hydrocarbons and other olefins by extracting a hydrocarbon feed, such as a $C_5$ cut from a catalytically cracked gasoline, using for example aqueous sulfuric acid as a liquid absorbent. Such extraction produces an overhead comprising the saturated $C_5$ hydrocarbons and other olefins and a rich solvent stream containing the tertiary amylenes. The tertiary amylenes obtained upon stripping the rich solvent are then dehydrogenated to produce isoprene. The dehydrogenation effluent and the aforementioned overhead (comprising the saturated $C_5$ hydrocarbons and other olefins) are each separately extracted with the same solvent, such as furfural or methyl carbitol. Extraction of said overhead produces an overhead comprising the $C_5$ paraffin hydrocarbons and a rich solvent stream containing the olefins. The latter rich solvent stream and the dehydrogenation effluent containing the isoprene are extracted in the same unit to produce an overhead comprising the olefins and a rich solvent stream containing the isoprene. The latter rich solvent is then stripped to obtain the isoprene product and to obtain the lean solvent which is used in both the extraction of the dehydrogenation effluent and the overhead comprising the saturated $C_5$ hydrocarbons and olefins.

This process is particularly advantageous in that only one solvent stripper is used for the extraction of the dehydrogenation effluent and the overhead comprising the $C_5$ paraffin hydrocarbons and other olefins (viz, pentenes), with the consequent reduced total solvent circulation. The separation of said overhead into a $C_5$ paraffin fraction and an olefin fraction is carried out without any heat requirement and the solvent used to effect this separation is conveniently available as an internal stream, such separation enabling the recovery of olefins which would not otherwise be recovered as a product stream. These and further objects and advantages of this invention will become apparent to those skilled in the art from the following discussion, appended claims, and accompanying drawing in which the single figure schematically illustrates in the form of a flow diagram the preferred embodiment of this invention.

Referring now to the drawing, a liquid hydrocarbon feed mixture (such as a $C_5$ cut from a catalytically cracked gasoline) comprising $C_4$ hydrocarbons, saturated $C_5$ hydrocarbons, tertiary amylenes, other $C_5$ olefins, and $C_6$ and heavier hydrocarbons, is passed via conduit 1 to conduit 2 where it is mixed with a liquid absorbent selective for the tertiary amylenes, viz, 2-methylbutene-1 and 2-methylbutene-2, which absorbent is supplied via conduit 3. The absorbent is preferably aqueous sulfuric acid having an acid concentration of 50–70 volume percent, preferably about 65 volume percent. Contact of the hydrocarbon feed with the aqueous sulfuric acid serves to absorb the tertiary amylenes and also to isomerize the 2-methylbutene-1 to 2-methylbutene-2, the latter being more easily dehydrogenated to isoprene. The hydrocarbon-acid mixture is passed through a cooler 4 and thence to a vessel 6 which functions as a liquid-liquid extractor. Suitable baffle means can be provided in vessel 6 to separate the same into compartments 7 and 8, and restrict the flow of fluid from compartment 7 to compartment 8. Hydrocarbon-acid mixture can be withdrawn from compartment 7 via line 9 and recycled to line 2 to provide a continuously circulating system. Flow restrictions can be inserted in lines 9 and 2 to increase the mixing of the acid and hydrocarbon. A rich solvent stream containing the tertiary amylenes can be withdrawn via line 11 from the bottom of compartment 8 of vessel 6 and a residual hydrocarbon phase removed from the upper region of compartment 8 via line 12, this latter phase comprising the non-absorbed hydrocarbons, namely $C_4$ hydrocarbons saturated $C_5$ hydrocarbons, $C_5$ olefins, and $C_6$ and heavier hydrocarbons. Stream 12 can be washed with caustic to remove residual acid when present.

The temperature of the continuous circulating hydrocarbon and acid mixture is preferably maintained below 100° F. and the concentration of the aqueous acid circulating phase is preferably maintained in the range of 40–70 volume percent. The contact can be carried out at atmospheric pressure or slightly higher, the average time of contact between the hydrocarbon and acid feed can be maintained in the range of 1–15 minutes, and the extractor 6 can operate in the temperature range of 55 to 90° F., preferably about 60° F.

The rich solvent stream 11 can be stripped by mixing it with a hydrocarbon such as normal butane, isobutane, propane, propylene, $C_5$ to $C_6$ paraffins and isoparaffins, etc., which hydrocarbon is supplied via line 15. I prefer to use for stripping a substantially vaporous paraffinic or olefinic hydrocarbon having 3 to 4 carbon atoms per molecule. The rich solvent-stripping hydrocarbon stream is passed via line 13 to a vessel 14 which serves as a stripper, this vessel being divided by a baffle into compartments 16 and 17. Hydrocarbon can be removed from compartment 16 via line 18 and passed to line 13 to provide a continuously circulating system. Stripper 14 can be operated at a temperature in the range of 80–135° F. and 75–150 p.s.i.a.

A lean solvent stream is removed from the bottom of compartment 17 of stripper 14 via line 19, cooled by means of heat exchanger 21, and passed via line 3 back to the initial extraction step, fresh solvent being supplied via line 22 as required. An overhead is removed from the upper part of compartment 17 of vessel 14 via line 23 and it comprises the tertiary amylenes and the vaporous hydrocarbon used in the stripping step. Stream 23 can be passed to a caustic scrubber for the removal of residual sulfuric acid and then passed to a fractionator 24. The latter is designed to separate by distillation the vaporous hydrocarbon used to strip the tertiary amylenes from the rich solvent stream. Accordingly, an overhead stream 26 is produced comprising the stripping gas part of which is recycled via line 15 for stripping and part of which is condensed by cooling means 27 and passed to an accumulator 28, from which some of the condensed hydrocarbon is returned via line 29 as reflux to fractionator 24. The bottom product from fractionator 24 comprises the teriary amylenes and it is vaporized in heat exchanger 32 and passed via line 33 to a dehydrogenation reactor 34.

In the dehydrogenation reactor 34, the tertiary amylenes are dehydrogenated to isoprene by contact with the catalyst under suitable conversion conditions. As most catalysts of this type are steam active, steam supplied by line 36 is admixed with the feed. Any suitable olefin dehydrogenation catalyst can be employed in reactor 34, such as a catalyst composed of 3 percent chromium oxide, 3 percent potassium carbonate and the balance iron oxide. A particularly suitable catalyst for this purpose is a potassium base material composed of 51–59 percent by weight of potassium carbonate, 40–49 percent by weight of chromium oxide and 1–10 percent by weight of iron oxide. With this particular catalyst, satisfactory conversion of the tertiary amylenes to isoprene can be obtained at temperatures of 1100–1250° F., 15 to 30 p.s.i.a., gaseous hourly space velocities of 300 to 1000, and steam to hydrocarbon ratios of 5/1 to 20/1. A typical dehydrogenation can be carried out at 1200° F., with a gaseous space velocity of 530, a steam to hydrocarbon mol ratio of 12/1, and atmospheric pressure. Following dehydrogenation, the effluent can be passed to a fractionator or gas concentration unit for the removal of methane, hydrogen, other light gases, water, and then is condensed by cooler 40.

The liquid dehydrogenation effluent, containing isoprene, is passed, in accordance with this invention, to a liquid-liquid extractor or extractive distillation 39 for the extraction of the isoprene with absorbent selective toward isoprene, the absorbent being supplied to the top of the column via line 41. Such absorbents include furfural, methyl carbitol, acetonitrile, ethylene diamine, alkylene carbonates, lactones, ethylene glycol, ethyl, carbitol, etc. Extractor 39 can be operated for example with a top temperature of 100–150° F., a bottom temperature of 275–325° F., with a reflux ratio of 10/1, and 30 p.s.i.a. A rich solvent stream containing other olefins is also introduced via line 42 to the upper end of extractor 39. This latter rich solvent stream is obtained from liquid-liquid extractor 43, which extracts such other olefins from the overhead product supplied from extractor 6 via line 12, extractor 43 also employing the same solvent used by extractor 39, the latter being introduced via line 44 to the upper end of extractor 43. In extractor 43, operated for example at 80–120° F., the $C_4$ hydrocarbons, saturated $C_5$ hydrocarbons and $C_6$ and heavier hydrocarbons are separated from the other olefins, such as cis-pentene-2 and trans-pentene-2. In extractor 39, an overhead comprising olefins, such as cis-pentene-2 and trans-pentene-2, is removed from the top of the extractor, a portion thereof being passed via reflux line 47 to the lower end of extractor 43, and a portion which can be yielded as product 46 or recycled to extractor 6. The bottom product from extractor 39 is withdrawn via line 48 and comprises the rich solvent containing the isoprene. This bottom product is passed to a stripped 49 provided with suitable heating means 51 in the kettle thereof. Stripper 49 can be operated with a top temperature of 160–185° F., a bottom temperature of 300–350° F., and a pressure of 40–75 p.s.i.a. The bottom product from stripper 49 is recycled via lines 41 and 44 to extractors 39 and 43, respectively. The overhead from stripper 49 is withdrawn via line 53, condensed by means of a cooler 54 such as an air-cooled condenser, and passed to an accumulator 56. Part of the liquid isoprene is returned via line 57 to stripper 49 as reflux, part is recycled via reflux line 58 to the bottom of extractor 39, and the balance is yielded as product via line 59.

The following material balance is set forth to further illustrate the objects and advantages of this invention, but it should be understood that the various stream compositions, flow rates, and other details recited in the material balance should not be construed to unduly limit this invention.

TABLE I.—MATERIAL BALANCE

| Stream Components | $C_5$ feed 1 | Extractor feed 2 | Overhead 12 | Rich acid 11 | Stripper feed 13 | Lean acid 19 | Overhead 23 | Frac. bottoms 33 | Dehydro. effluent 37 |
|---|---|---|---|---|---|---|---|---|---|
| $C_4$ hydrocarbons | 180 | 180 | 180 | | 4,070 | 4 | 4,066 | | |
| Isopentane | 210 | 210 | 210 | | | | | | |
| n-Pentane | 420 | 420 | 420 | | | | | | |
| 3-Methylbutene-1 | 70 | 70 | 63 | 7 | 7 | | 7 | 7 | 5 |
| 2-Methylbutene-1 | 420 | 420 | 36 | 4 | 4 | 2 | 2 | 2 | 1 |
| 2-Methylbutene-2 | 814 | 966 | 260 | 1,087 | 1,087 | 152 | 926 | 926 | 556 |
| Pentene-1 | 75 | 75 | 67 | 8 | 8 | | 8 | 8 | 4 |
| Cis-Pentene-2 | 390 | 390 | 351 | 39 | 39 | | 39 | 39 | 20 |
| trans-Pentene-2 | 180 | 180 | 162 | 18 | 18 | | 18 | 18 | 9 |
| $C_6^+$ hydrocarbons | 39 | 39 | 39 | | | | | | |
| Sulfuric acid | | 7,400 | *5 | 7,395 | 7,395 | 7,395 | | | |
| Furfural | | | | | | | | | 405 |
| Isoprene | | | | | | | | | |
| Totals | 2,798 | 10,350 | 1,793 | 8,558 | 12,628 | 7,553 | 5,066 | 1,000 | 1,000 |

| Stream Components | Overhead 45 | Rich furfural 42 | Extractor feed 42+38 | Rich furfural 48 | Overhead product 46 | Lean furfural 52 | Lean furfural 41 | Lean furfural 44 | Isoprene product 59 |
|---|---|---|---|---|---|---|---|---|---|
| $C_4$ hydrocarbons | 180 | | | | | | | | |
| Isopentane | 210 | | | | | | | | |
| n-Pentane | 420 | | | | | | | | |
| 3-Methylbutene-1 | 5 | 58 | 63 | 1 | 63 | | | | |
| 2-Methylbutene-1 | 2 | 34 | 35 | 1 | 34 | | | | 1 |
| 2-Methylbutene-2 | 10 | 250 | 806 | 40 | 766 | | | | 40 |
| Pentene-1 | 6 | 61 | 65 | | 65 | | | | |
| Cis-Pentene-2 | 8 | 343 | 363 | 11 | 352 | | | | 11 |
| trans-Pentene-2 | 3 | 159 | 168 | 5 | 163 | | | | 5 |
| $C_6^+$ hydrocarbons | 20 | 19 | 19 | 19 | | | | | 19 |
| Sulfuric acid | | | | | | | | | |
| Furfural | | 8,616 | 23,208 | 23,208 | | 23,208 | 14,882 | 8,316 | |
| Isoprene | 405 | | 405 | 397 | 8 | | | | 397 |
| Totals | 864 | 9,240 | 24,132 | 23,681 | 1,451 | 23,208 | 14,882 | 8,316 | 473 |

*This acid is removed from overhead 12 by a caustic wash before overhead is passed to extractor 43.

Various modifications and alterations of this invention will become apparent to those skilled in the art from the description and accompanying drawing without departing from the scope and spirit of this invention, and it should be understood that this invention is not to be limited unduly to the preferred embodiments set forth herein for illustrative purposes.

I claim:
1. A process for the production of isoprene, which comprises extracting in a first zone a hydrocarbon feed comprising $C_4$ hydrocarbons, saturated $C_5$ hydrocarbons, tertiary amylenes, and other $C_5$ olefins with a first liquid absorbent selective for said tertiary amylenes to obtain a first stream comprising said $C_4$ hydrocarbons, saturated $C_5$ hydrocarbons and other $C_5$ olefins and a first rich absorbent stream comprising said first liquid absorbent and said tertiary amylenes, stripping said first rich absorbent to obtain a first lean absorbent stream and a second stream comprising said tertiary amylenes, recycling said first lean absorbent to said first zone for use as said first liquid absorbent, passing said second stream to a dehydrogenation zone for production of isoprene, passing the resulting dehydrogenation effluent comprising isoprene and tertiary amylenes to a second zone and extracting said effluent therein with a second liquid absorbent selective for isoprene, passing said first stream to a third zone and extracting the same therein with said second liquid absorbent, withdrawing a third stream comprising $C_4$ and $C_5$ saturated hydrocarbons from said third zone and a second rich absorbent stream comprising said second liquid absorbent and olefins, passing said rich absorbent stream to said second zone, withdrawing a fourth stream comprising olefins from said second zone, withdrawing a third rich absorbent stream comprising said second liquid absorbent and isoprene from said second zone, stripping the latter stream to obtain an isoprene product and lean absorbent, recycling the latter to said second and third zones for use therein as said second liquid absorbent.

2. A process for the production of isoprene, which comprises extracting in a first zone a hydrocarbon feed comprising $C_4$ hydrocarbons, saturated $C_5$ hydrocarbons, tertiary amylenes, and other $C_5$ olefins with aqueous sulfuric acid selective for said tertiary amylenes to obtain a first stream comprising said $C_4$ hydrocarbons, saturated $C_5$ hydrocarbons and other $C_5$ olefins and a first rich absorbent stream comprising said aqueous sulfuric acid and said tertiary amylenes, stripping said first rich absorbent with a gaseous low molecular weight paraffin to obtain a first lean absorbent stream and a second stream comprising said low molecular weight paraffin and tertiary amylenes, recycling said first lean absorbent to said first zone for use as said aqueous sulfuric acid, passing said second stream to a fractionation zone for separation of said tertiary amylenes and said low molecular weight paraffin, recycling the latter for stripping of said second stream, passing the latter-mentioned tertiary amylenes to a dehydrogenation zone for production of isoprene, passing the resulting dehydrogenation effluent comprising isoprene and tertiary amylenes to a second zone, and extracting said effluent therein with a second liquid absorbent selective for isoprene, passing said first stream to a third zone and extracting the same therein with said second liquid absorbent, withdrawing a third stream comprising $C_4$ and $C_5$ saturated hydrocarbons from said third zone and a second rich absorbent stream comprising said second liquid absorbent and olefins, passing said second rich absorbent stream to said second zone, withdrawing a fourth stream comprising olefins from said second zone, withdrawing a third rich absorbent stream comprising said second liquid absorbent and isoprene from said second zone, stripping the latter stream with heat to obtain an isoprene product stream and a second lean absorbent stream, and recycling the latter to said second and third zones for use therein as said second liquid absorbent.

3. The process according to claim 2, wherein said second liquid absorbent is furfural.

4. The process according to claim 2, wherein said second liquid absorbent is methyl carbitol.

References Cited by the Examiner

UNITED STATES PATENTS

| | | | |
|---|---|---|---|
| 2,717,229 | 9/1955 | Findlay | 208—321 |
| 2,727,848 | 12/1955 | Georgian | 208—321 |
| 3,038,016 | 6/1962 | Hachmuth | 260—680 |
| 3,113,163 | 12/1963 | Edwards et al. | 260—680 |

DELBERT E. GANTZ, *Primary Examiner.*

R. H. SHUBERT, *Assistant Examiner.*